US010915656B2

(12) United States Patent
Nick et al.

(10) Patent No.: US 10,915,656 B2
(45) Date of Patent: *Feb. 9, 2021

(54) ROLLBACK PROTECTION FOR LOGIN SECURITY POLICY

(71) Applicant: Microsoft Technology Licensing, LLC, Redmond, WA (US)

(72) Inventors: Benjamin Nick, Bellevue, WA (US); Magnus Nystrom, Duvall, WA (US); Innokentiy Basmov, Redmond, WA (US); Peter Novotney, Seattle, WA (US); Michael Grass, Sandy, UT (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 342 days.

This patent is subject to a terminal disclaimer.

(21) Appl. No.: 15/962,847

(22) Filed: Apr. 25, 2018

(65) Prior Publication Data

US 2018/0239927 A1 Aug. 23, 2018

Related U.S. Application Data

(63) Continuation of application No. 13/531,481, filed on Jun. 22, 2012, now Pat. No. 9,984,250.

(51) Int. Cl.
*G06F 21/62* (2013.01)
*G06F 21/55* (2013.01)

(52) U.S. Cl.
CPC ........ *G06F 21/6245* (2013.01); *G06F 21/554* (2013.01)

(58) Field of Classification Search
CPC ........................... G06F 21/6245; G06F 21/554
See application file for complete search history.

(56) References Cited

U.S. PATENT DOCUMENTS

| 5,414,833 | A  | * | 5/1995 | Hershey ............... H04L 63/145 726/22 |
| 6,079,016 | A  | * | 6/2000 | Park ....................... G06F 9/441 713/2 |
| 8,230,455 | B2 | * | 7/2012 | Hazlewood ........... H04L 63/083 713/183 |
| 8,424,098 | B2 | * | 4/2013 | Bhatia ................... H04L 9/3215 726/26 |
| 8,639,625 | B1 | * | 1/2014 | Ginter ..................... G06F 21/51 705/51 |
| 8,776,190 | B1 | * | 7/2014 | Cavage .................. G06F 21/33 726/5 |
| 9,002,750 | B1 | * | 4/2015 | Chu .................... G06Q 20/4012 705/72 |
| 2005/0055560 | A1 | * | 3/2005 | Kendon ............. G06F 21/6245 713/189 |

(Continued)

*Primary Examiner* — Ali S Abyaneh
*Assistant Examiner* — Shu Chun Gao
(74) *Attorney, Agent, or Firm* — Arent Fox LLP

(57) ABSTRACT

In one embodiment, an encryption system may protect user login metadata from hammering attacks. A data storage may store an integrity protected data set for an operating system in a storage location. A processor may register a counter reading from a remote counter in a secure location separate from the storage location. The processor may determine a lockout state of the integrity protected data set based on the counter reading.

16 Claims, 9 Drawing Sheets

(56) References Cited

U.S. PATENT DOCUMENTS

| | | | |
|---|---|---|---|
| 2011/0239044 A1* | 9/2011 | Kumar | G06Q 20/02 |
| | | | 714/15 |
| 2012/0060213 A1* | 3/2012 | Childress | G06F 21/31 |
| | | | 726/18 |
| 2012/0151223 A1* | 6/2012 | Conde Marques | |
| | | | G06F 21/6218 |
| | | | 713/193 |
| 2014/0068722 A1* | 3/2014 | Hayat | G06Q 20/40 |
| | | | 726/4 |
| 2016/0173485 A1* | 6/2016 | Popoveniuc | H04L 63/1433 |
| | | | 726/1 |

* cited by examiner

*400*

ROLLBACK PROTECTION FOR LOGIN SECURITY POLICY

CROSS-REFERENCE TO RELATED CASES

The present Application for Patent is a continuation of U.S. patent application Ser. No. 13/531,481, entitled "ROLLBACK PROTECTION FOR LOGIN SECURITY POLICY" filed Jun. 22, 2012, now U.S. Pat. No. 9,984,250, which is assigned to the assignee hereof and hereby expressly incorporated by reference herein.

BACKGROUND

A user may handle sensitive data on unmanaged consumer devices, such as personal cell phones, tablets, and mobile computing devices. As a result, lost mobile devices may disclose sensitive data if misplaced. A corporation may counteract this by deploying a security policy prior to allowing consumer devices to access corporate email. The security policy may establish user accounts with a maximum number of unsuccessful login attempts before making the data inaccessible, for example by executing a "wipe" of the data. However, an attacker may acquire an unlimited number of attempts to guess a password by using a replay attack.

In a replay attack, an attacker may capture a device in a pre-wiped state, copying any relevant data from the hard disk, such as the encrypted components. The attacker may then attempt to login as the user. Prior to a wipe occurring, the attacker may restore the disk to a previous state, effectively setting the device back to a "pre-wipe" condition. This attack may grant the attacker extra attempts to guess new passwords. Alternatively, the attacker may restore the disk back to a previous state after each password attempt.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to protecting user login metadata from hammering attacks. A data storage may store an integrity protected data set for an operating system in a storage location. A processor may register a counter reading from a remote counter in a secure location separate from the storage location. The processor may determine a lockout state of the integrity protected data set based on the counter reading.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
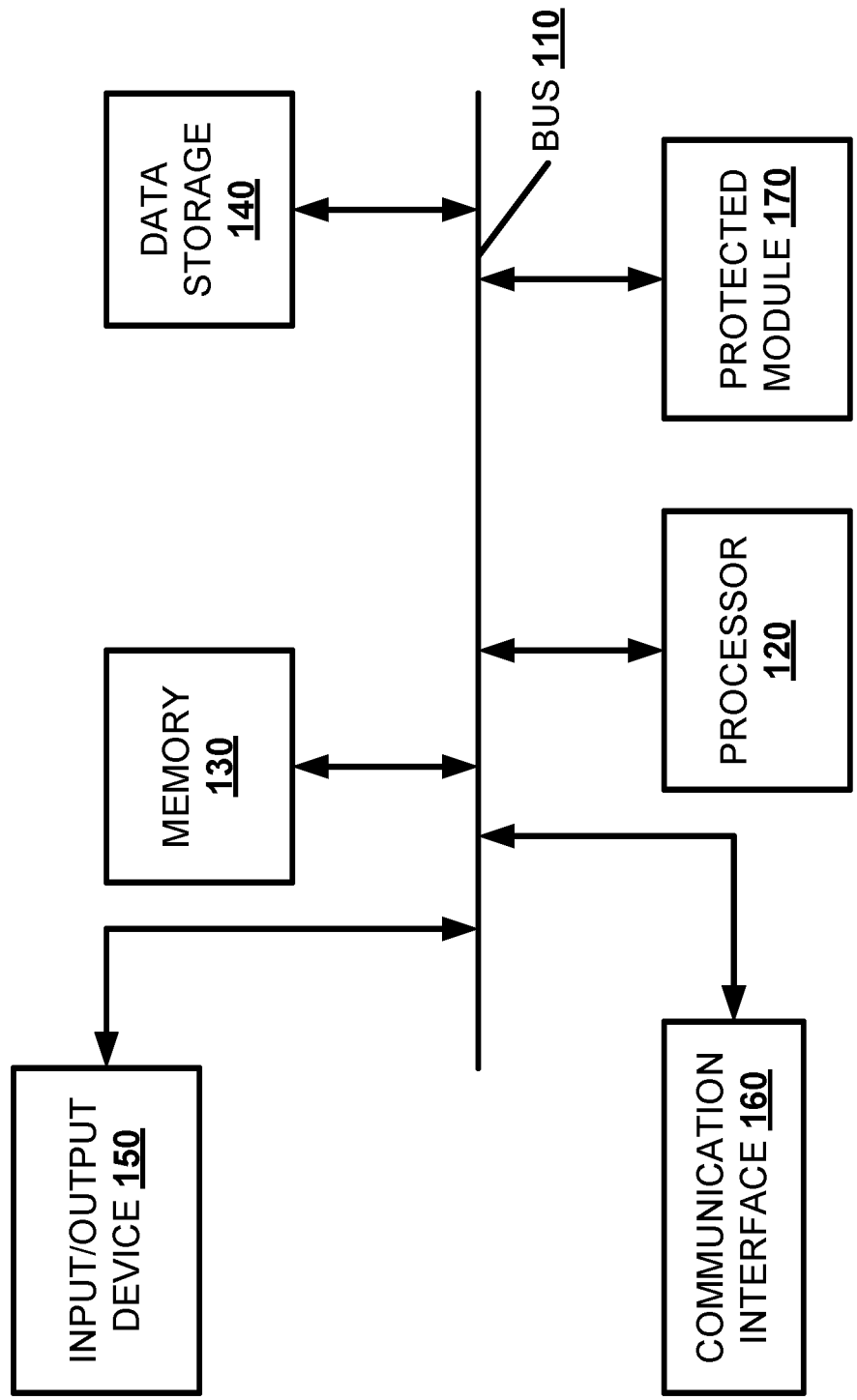
FIG. 1 illustrates, in a block diagram, one embodiment of a computing device.

Embodiments are discussed in detail below. While specific implementations are discussed, these implementations are strictly for illustration purposes. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or an encryption system.

Encryption may prevent an attacker from accessing user data in clear text directly from disk. An attacker may attempt to circumvent the encryption by guessing the users login credentials, then accessing the clear text data directly as a logged in user. Device lock capability may partially mitigate this attack by rendering the encryption keys for accessing data in clear text inaccessible without stronger authentication. A logon process may activate device lock after an attempt limit has been reached. However, an attacker may circumvent device lock and acquire an unlimited number of attempts to guess a user's password by using a replay attack.

In a replay attack, an attacker may capture a device in the pre-lockout state and copy any relevant data from the hard disk, including all the encrypted components. The attacker may then attempt to login as the user. Once device lock has occurred, the attacker may restore the disk to a previous state, effectively setting the device back to a "pre-lockout" condition. This "rollback" may grant the attacker more chances to guess new passwords. Alternatively the attacker may restore the disk, or selectively restore critical data on the disk, back to a previous state after each password attempt, such that the device lock state is avoided entirely. This rollback attack may be used to access system data such as a user login metadata set, a user account, an application trial period, or other sensitive data of the user.

The rollback attack may potentially be hindered by forcing the attacker to either scan the entire disk or restore the entire disk to a previous state, as opposed to just selectively restoring easily located data relevant to drive encryption key material, the password, or the lockout state. The encryption system may hide a login counter at a random hidden location on disk. The encryption system may increment the login counter whenever a login attempt occurs. When the login counter reaches a threshold defined by login policy, the encryption system may block further login attempts. The unpredictable location of the counter may force the attacker to compare different full images of the disk to identify sectors that differ in order to determine which sectors to restore to reset the login counter and enable further login attempts. A complete disk scan may be costly in terms of time. Note that the encryption system may store the login counter at a new random hidden location after each logon attempt and system boot up.

The encryption system may mitigate a rollback attack by limiting the rate of password guesses using a protected module, a hardened hardware component independent from the disk. For example, a protected module, such as a trusted platform module, may have hardware anti-hammering protections built in to protect against attempts to unseal protected data. The protected module may limit login attempts on user login credentials, with a longer and longer cooling period between password guesses. The encryption system may perform this operation prior to validating any login attempt. The encryption system may wait for the protected module to respond prior to validating the password.

As login attempts become more numerous, the protected module cooling periods may become longer and longer. The protected module cooling implementation logic may vary, but at a maximum cooling period of one attempt every 24 hours, an attacker may take more than a year to successfully guess a random 4 digit numeric password. The cooling period delay may be reset either upon a successful login or resetting the protected module using a protected module ownership key. Resetting the protected module may prevent unlocking the encrypted data, which may be counterproductive for the attacker.

The encryption system may combine the use of a remote counter and a protected module to protect the encrypted data. The encryption system may create an integrity protected data set containing any state data used to enforce the login policy. The encryption system may then store the encrypted login data set, or a cryptographic hash of the encrypted login data set, in a location on disk, referred to as integrity protected user login metadata set. The encryption system may integrity protect the storage location with a secret key known to the encryption system.

The encryption system may store this user login metadata set on disk. An attacker may roll back the user login metadata set to a previous legitimate version if there are no additional protections. To protect against "rollback", the encryption system may use a monotonic counter supported by the underlying hardware or firmware of the computer. The monotonic counter increases in value without decreasing. The monotonic counter may be protected from rollback attacks with an independent mechanism, such as a replay protected memory. Also, the monotonic counter maximum value should greatly exceed the number of log-in attempts for the life of the system, hardening the monotonic counter against "wrap around" attacks. In a "wrap around" attack, an attacker increments the counter until the counter resets back to a zero value or "wraps". Also the time for an attacker to increment the counter to a maximum value may exceed the expected time the data is protected.

The encryption may assign the user login metadata set a version number synchronized with the value of the monotonic counter. Whenever a user attempts to login, the encryption system updates the policy state stored in the metadata, or a hash of the policy state. When updating the user login metadata set, the encryption system may update both the version number and the monotonic counter. So long as the version number is greater than or equal to the monotonic counter value, the encryption system may consider the version of the metadata to be valid. The encryption system may increment the metadata version first, then the counter, and then the user login metadata set content, to protect against timing attacks on the user login metadata set to coincide with forced power outages to the device.

If the attacker attempts to rollback the metadata, the encryption system may detect that the version number is less than the monotonic counter and reject the metadata contents as invalid. The encryption system may then enforce a device lockout until such time as when a user enters the recovery key, signaling the machine is in the hands of a trusted entity. The encryption system may then create a new version of the metadata that is synchronized with the current value of the monotonic counter.

This combined approach may support multi-boot scenarios, where multiple operating system instances may have exclusive access to a login counter. The combined approach may be used to prevent replay attacks on other data types beyond login metadata, such as restoring a deleted user account, or resetting a trial period for an application.

In some cases, a protected module may not have a monotonic counter available, but may instead use firmware functionality, such as a Unified Extensible Firmware Interface. The Unified Extensible Firmware Interface defines an interface and associated services between an operating system and a platform firmware. The Unified Extensible Firmware Interface may store the counter in a Unified Extensible Firmware Interface secure variable that allows the encryption system to specify a signing key pair to protect the Unified Extensible Firmware Interface secure variable from unauthorized access. The private key may then be stored as encrypted metadata, accessible by the encryption system. The Unified Extensible Firmware Interface secure variable value may be protected from replay by having the variable updates signed with a signing key and include a timestamp. The firmware may check the provided timestamp against a previously stored value. The firmware may reject random or incorrect data, including out-of-date timestamps, thereby preventing a replay attack.

Additionally, a data storage may store a set of user login counters in the encrypted metadata set accessible through a lockout driver. The lockout driver may perform the integrity check for the user login counter set immediately without having to load the full operating system. Further, moving the user login counter set to a section of data storage that is reserved for encrypted metadata greatly reduces the risk of changes to the user login count from legitimate system configuration changes. Failure to accommodate enough unique user login counters to track bad password attempts may be an indication that the system is under attack.

Thus, in one embodiment, an encryption system may protect user login metadata from hammering attacks. A data storage may store a user login metadata set for an operating system in a storage location. A processor may register a counter reading from a remote counter in a secure location separate from the storage location. The processor may determine a lockout state of the user login metadata set based on the counter reading.

FIG. 1 illustrates a block diagram of an exemplary computing device 100 which may act as an encryption system. The computing device 100 may combine one or more of hardware, software, firmware, and system-on-a-chip technology to implement an encryption system. The computing device 100 may include a bus 110, a processor 120, a memory 130, a data storage 140, an input/ouput device 150, a communication interface 160, and a protected module 170.

The bus 110, or other component interconnections, may permit communication among the components of the computing device 100.

The processor 120 may include at least one conventional processor or microprocessor that interprets and executes a set of instructions. The memory 130 may be a random access memory (RAM) or another type of dynamic storage device that stores information and instructions for execution by the processor 120. The memory 130 may also store temporary variables or other intermediate information used during execution of instructions by the processor 120. The data storage 140 may include a conventional read only memory (ROM) device or another type of static storage device that stores static information and instructions for the processor 120. The data storage 140 may include any type of tangible machine-readable medium, such as, for example, magnetic or optical recording media and its corresponding drive. A tangible machine-readable medium is a physical medium storing machine-readable code or instructions, as opposed to a transitory medium or signal. The data storage 140 may store a set of instructions detailing a method that when executed by one or more processors cause the one or more processors to perform the method. The data storage 140 may also be a database or a database interface.

The input/output device 150 may include one or more conventional mechanisms that permit a user to input information to the computing device 100, such as a keyboard, a mouse, a voice recognition device, a microphone, a headset, a touch screen, a motion capture device, or other input devices. The input/output device 150 may include one or more conventional mechanisms that output information to the user, including a display, a printer, one or more speakers, a headset, or a medium, such as a memory, or a magnetic or optical disk and a corresponding disk drive. The communication interface 160 may include any transceiver-like mechanism that enables computing device 100 to communicate with other devices or networks. The communication interface 160 may include a network interface or a transceiver interface. The communication interface 160 may be a wireless, wired, or optical interface. A protected module 170 is a secure processor that uses anti-hammering technology or other techniques to protect the storage of cryptographic keys, such as a trusted platform module or a Unified Extensible Firmware Interface.

The computing device 100 may perform such functions in response to a processor 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 160.

The encryption system may seek to protect a set of user login metadata from being accessed by an unauthorized party. Login metadata is used by the system to establish a user session, so that user data is not shared with an unauthorized party. The encryption system may use a remote counter, a protected module, or a combination of the two.

Figure 2:
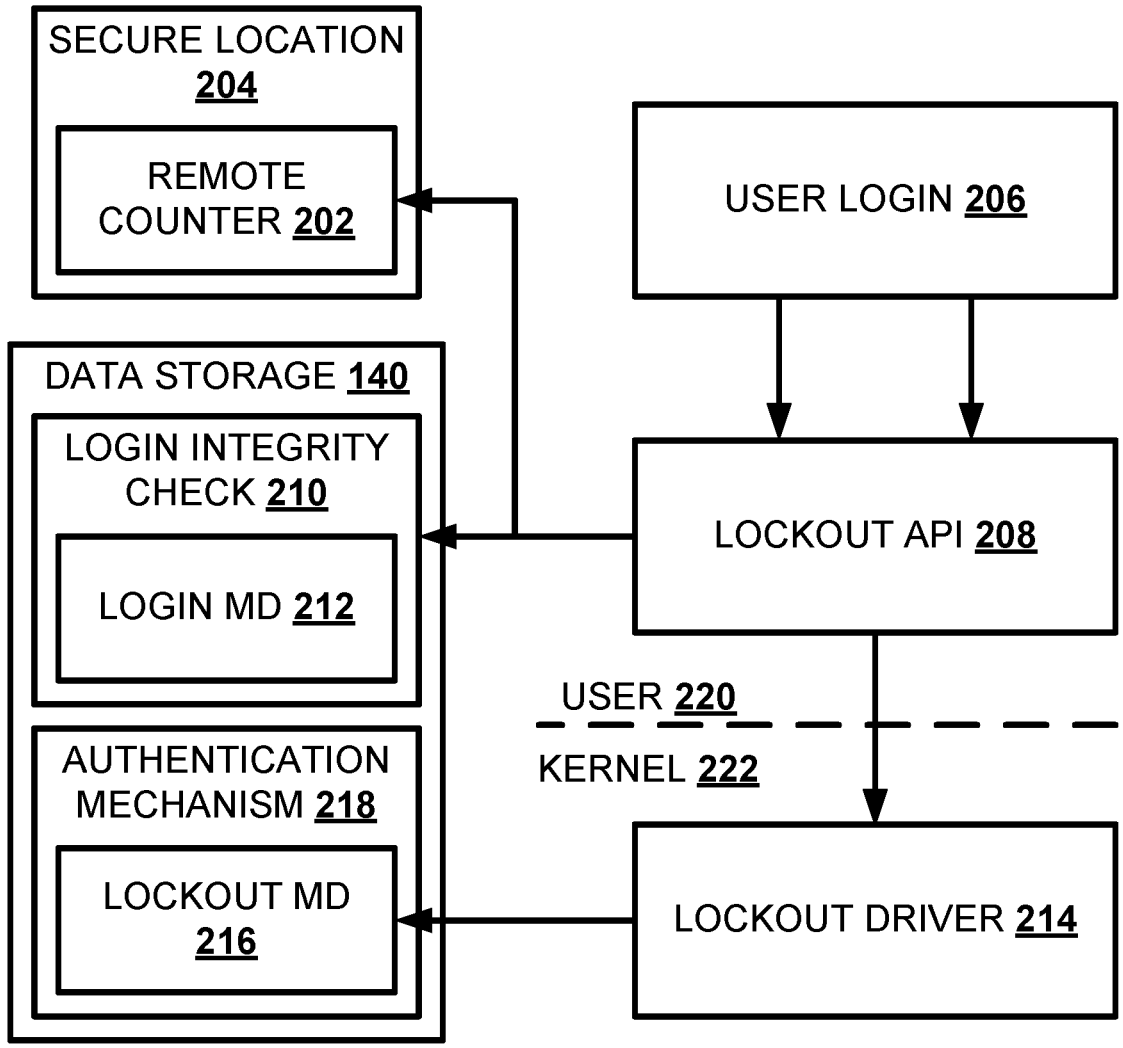
FIG. 2 illustrates, in a block diagram, one embodiment of a remote counter configuration.

FIG. 2 illustrates, in a block diagram, one embodiment of a remote counter configuration 200. The encryption system may protect the login process by referencing a remote counter 202 kept in a secure location 204. A remote counter is kept in a separate data location from the data being protected, but may be in the same data storage. A secure location 204 is a location that is secure from tampering either because the location is hidden or protected. A protected location is secure from tampering even if the location is known, such as a trusted platform module or a Unified Extensible Firmware Interface secure variable. The remote counter 202 may be a counter hidden in an encrypted area of the data storage, the monotonic counter of the protected module 170, or a secure counter stored in a secure variable of a protected module 170.

A user may enter a login attempt into a user login application module 206. Upon a successful login attempt, the user login application module 206 may direct a lockout application program interface 208 to perform a set of login integrity check instructions 210 stored in the data storage 140. If the login attempt is successful, the lockout application programming interface 208 may use a user login metadata (MD) set 212 to grant access to the system. If the login attempt fails, the lockout application programming interface 208 may increment the remote counter 202. Alternately, the lockout application programming interface 208 may increment the remote counter 202 regardless of the success or failure of the login attempt. The secure location 204 of the remote counter 202 may be in the same data storage 140 as the user login metadata set 212, as long as the remote counter 202 is kept in a separate storage location on the data storage 140 from the user login metadata set 212.

If a counter reading of the remote counter 202 indicates that a login attempt threshold has been exceeded or that the user login metadata set has been tampered with, the lockout application programming interface module 208 may direct a lockout driver 214 to adjust a lockout state of the user login metadata set 212 from unlocked to locked. A user login metadata set 212 with a locked lockout state has a second level of encryption having a greater degree of complexity. For example, the second level of encryption may be decrypted using a forty-eight character key. The lockout driver 214 may store the lockout metadata set 216 with higher assurance authentication mechanisms 218.

The user login application module 206 and the lockout application programming interface 208 may operate in the user side 220 of the operating system. The lockout driver 214 may operate in the kernel side 222 of the operating system or in the environment that precedes the execution of the operating system.

Figure 3:
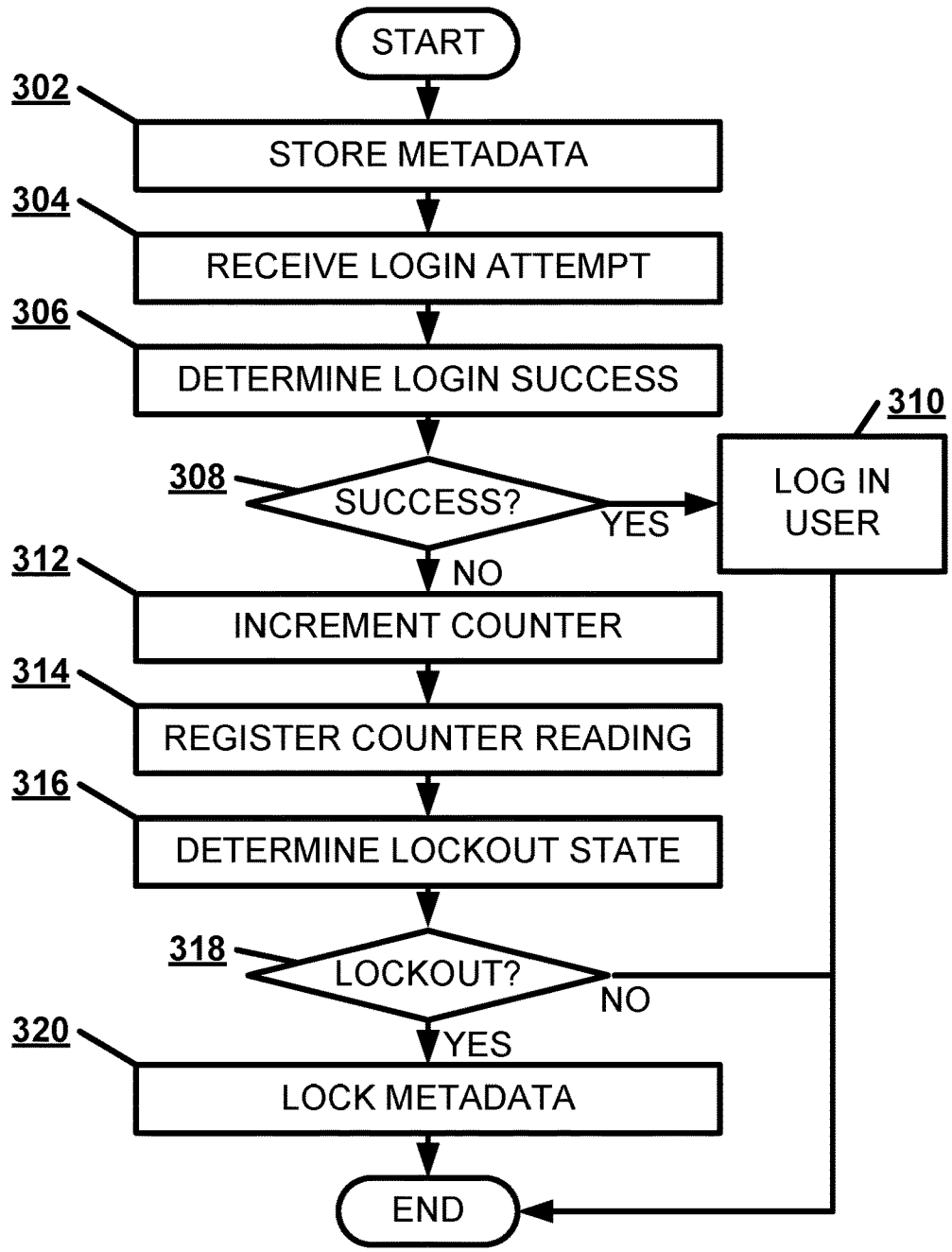
FIG. 3 illustrates, in a flowchart, one embodiment of a method for protecting a user login metadata set using a remote counter.

FIG. 3 illustrates, in a flowchart, one embodiment of a method for protecting a user login metadata set using a remote counter 202. The encryption system may store a user login metadata set 212 for an operating system in a storage location (Block 302). The encryption system may receive a login attempt from the user (Block 304). The encryption system may determine if the login attempt was successful (Block 306). If the integrity check is successful (Block 308), the encryption system may log in the user to grant the user access to the operating system (Block 310). Otherwise, the encryption system may increment a remote counter 202 in a secure location 204 separate from the storage location (Block 312). Alternatively, the encryption system may increment the remote counter 202 regardless of the success or failure of the login attempt. The encryption system may register a counter reading from the remote counter 202 in the secure location 204 separate from the storage location (Block 314). The encryption system may determine a lockout state of the user login metadata set 212 based on the counter reading (Block 316). If the counter reading indicates that the user login metadata set 212 is to be locked down (Block 318), the encryption system may lock down the user login metadata set 212 so that the user may have to acquire further credentials to decrypt the user login metadata set 212 (Block 320).

Figure 4:
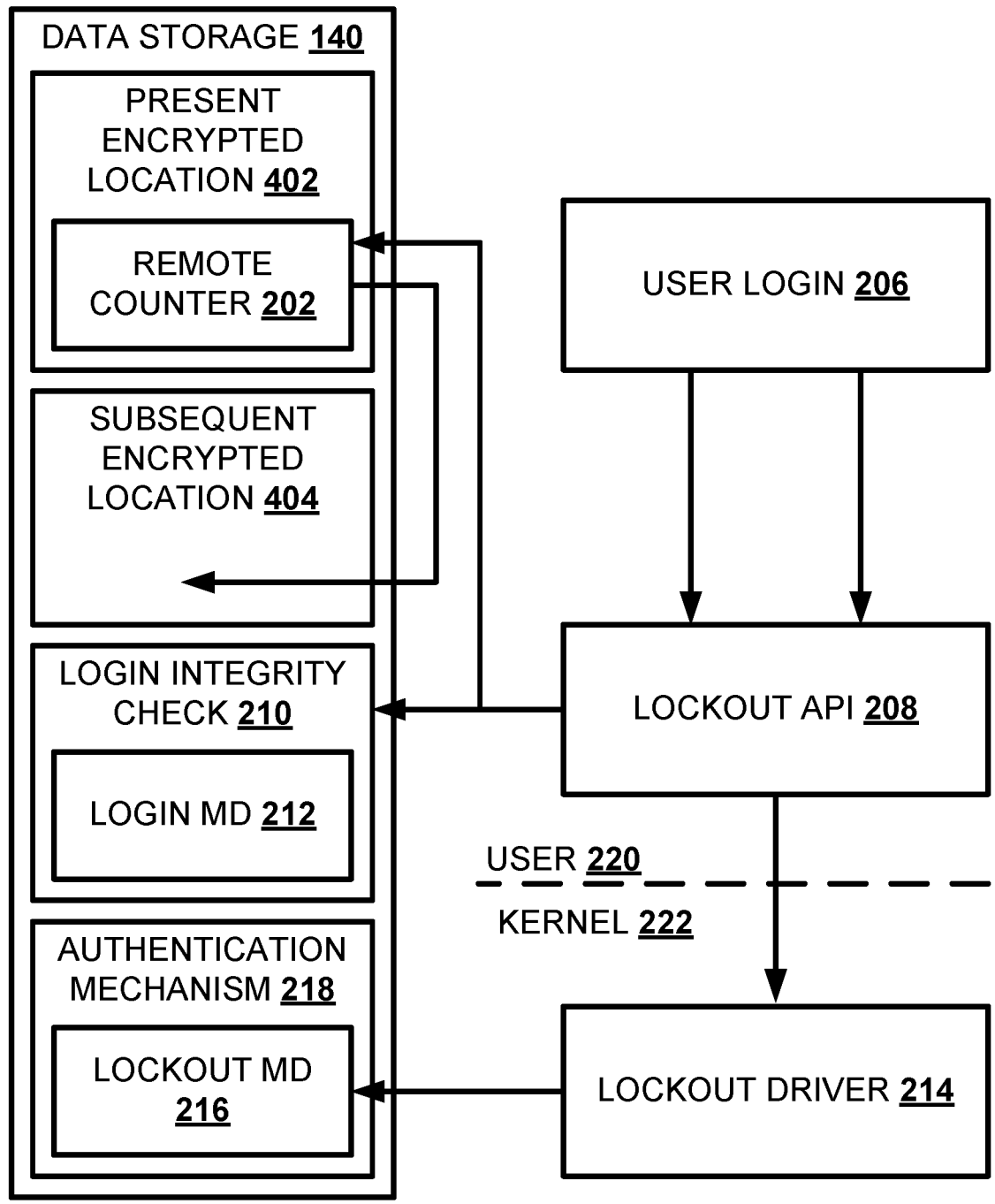
FIG. 4 illustrates, in a block diagram, one embodiment of an encrypted counter configuration.

FIG. 4 illustrates, in a block diagram, one embodiment of an encrypted counter configuration. The remote counter 202 may be an encrypted counter kept in an encrypted location in the data storage 140 acting as a secure location 204. The remote counter 202 may be stored in a present encrypted location 402 of the data storage 140. The remote counter 202 may be moved from the present encrypted location 402 of the data storage 140 to a subsequent encrypted location 404 to further prevent the remote counter 202 from being easily discovered. A login attempt or a boot up may trigger the counter movement from the present encrypted location 402 to the subsequent encrypted location 404. A boot up refers to the operating system being activated. The login attempt may be successful or unsuccessful to trigger the counter movement.

Figure 5:
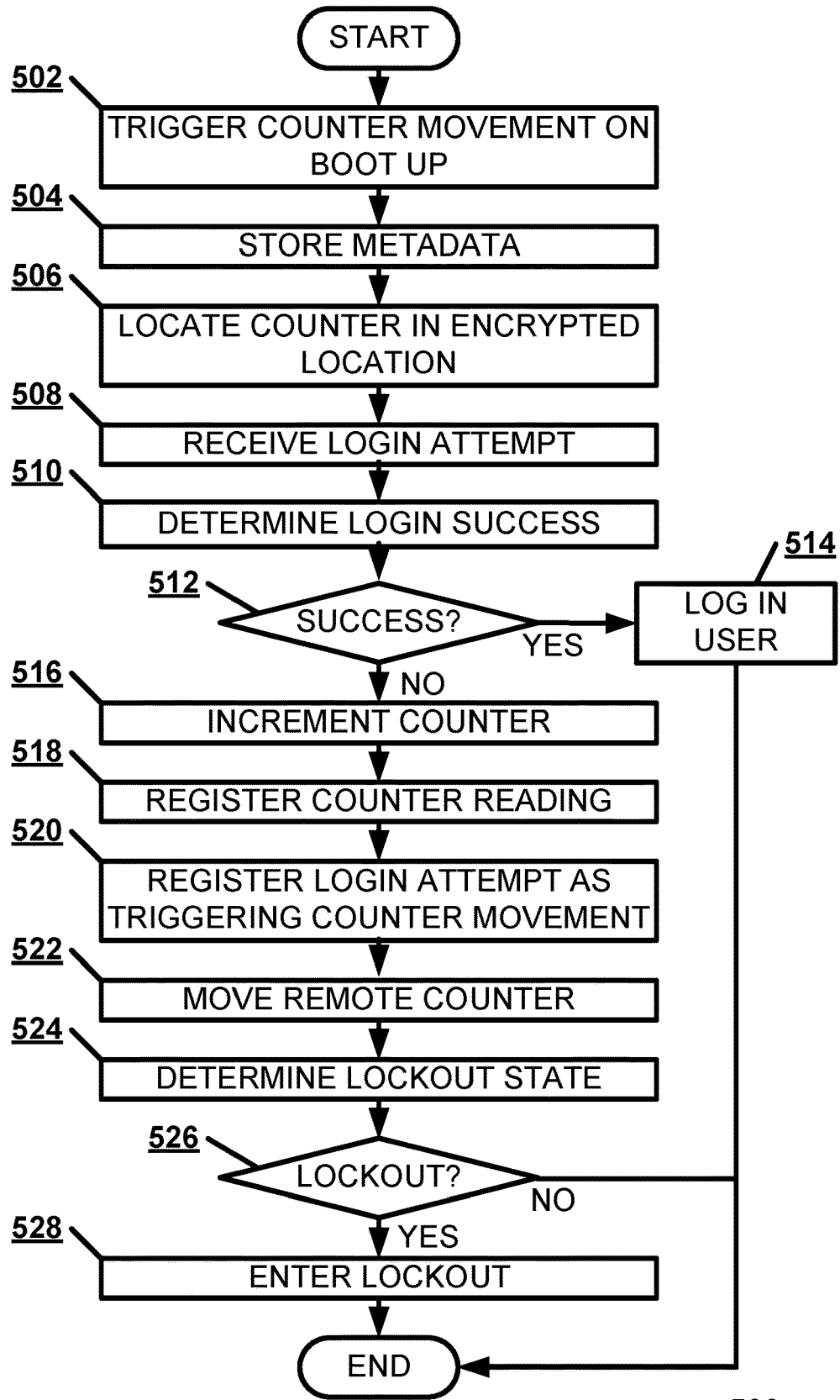
FIG. 5 illustrates, in a flowchart, one embodiment of a method for protecting a user login metadata set using an encrypted counter.

FIG. 5 illustrates, in a flowchart, one embodiment of a method 500 for protecting a user login metadata set using an encrypted counter. The encryption system may register boot up as triggering a counter movement to the present encrypted location (Block 502). The encryption system may store a user login metadata set 212 for an operating system in a storage location (Block 504). The encryption system may locate a secure location 204 of the remote counter 202 in a present encrypted location 402 of a data storage 140 (Block 506). The encryption system may receive a login attempt from the user (Block 508). The encryption system may determine if the login attempt was successful (Block 510). If the integrity check is successful (Block 512), the encryption system may log in the user to grant the user access to the operating system (Block 514). Otherwise, the encryption system may increment the remote counter 202 in the present encrypted location 402 (Block 516). Alternatively, the encryption system may increment the remote counter 202 regardless of the success or failure of the login attempt. The encryption system may register a counter reading from the remote counter in the present encrypted location 402 (Block 518). The encryption system may register a login attempt as triggering a counter movement (Block 520). The encryption system may move the remote counter 202 to a subsequent encrypted location from the present encrypted location 402 (Block 522). The encryption system may determine a lockout state of the user login metadata set 212 based on the counter reading (Block 524). If the counter reading indicates that the user login metadata set 212 is to be locked down (Block 526), the encryption system may lock down the user login metadata set 212 by further encrypting the user login metadata set 212 (Block 528).

Alternatively, the encryption system may use a protected module, such as a protected module 170, to protect the user login metadata set 212. A protected module may use many different techniques to protect data encrypted by the protected module 170. For example, the protected module 170 may employ an anti-hammering technique, such having a cooling period before allowing a login attempt that increases after each unsuccessful login attempt.

Figure 6:
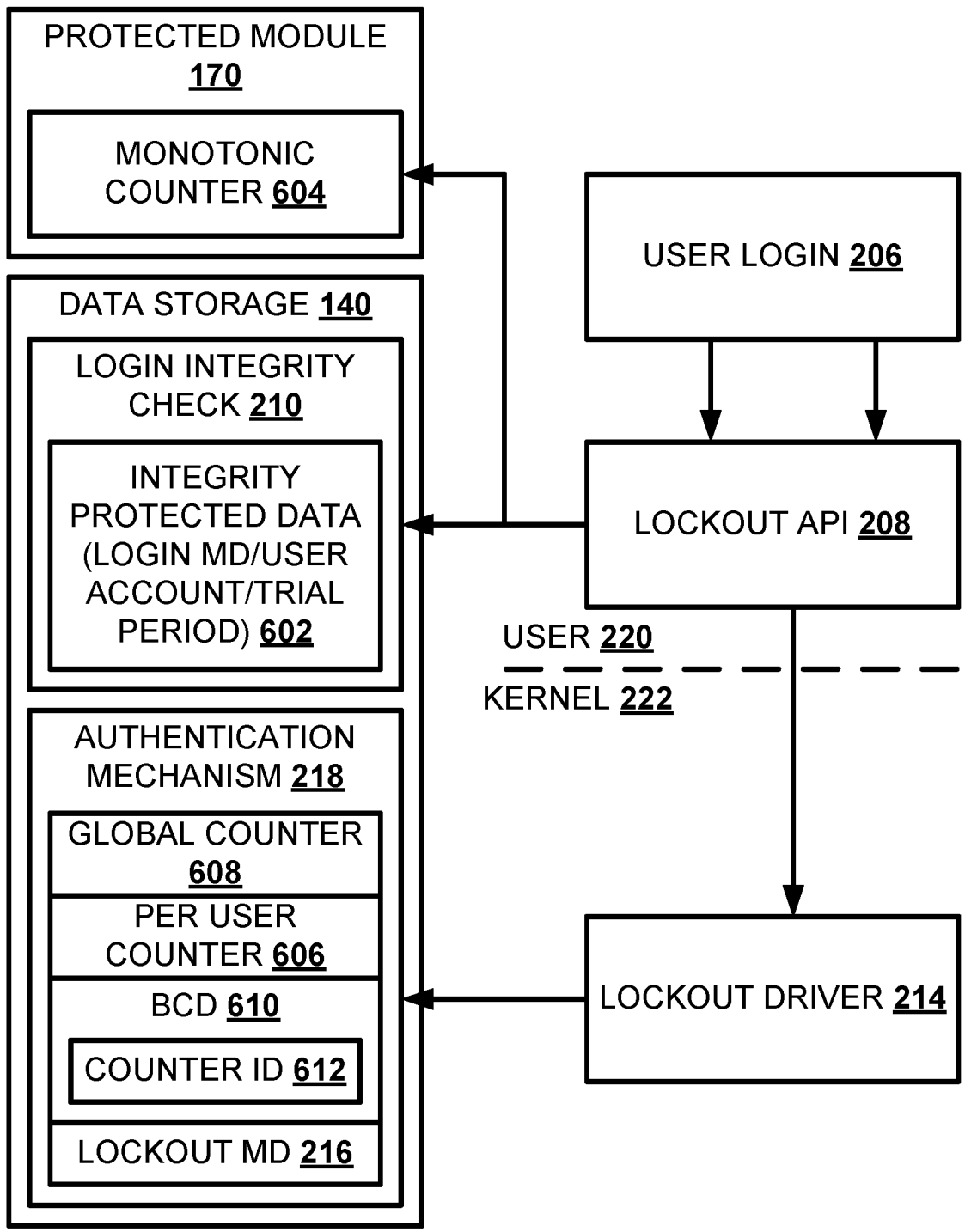
FIG. 6 illustrates, in a block diagram, one embodiment of a matched monotonic counter configuration.

A matched counter configuration may combine the use of a remote counter with a protected module. A counter local to the integrity protected data set may be matched to a protected monotonic counter in the protected module. FIG. 6 illustrates, in a block diagram, one embodiment of a matched monotonic counter configuration 600. A matched counter configuration may be expanded to protect an integrity protected data set 602 beyond a user login metadata set 212. For example, the integrity protected data set 602 may be a user login metadata set 212, a user account, an application trial period or other sensitive system data.

The protected module 170, such as a trusted platform module, may have a protected monotonic counter 604 that may act as a global counter. A protected monotonic counter 604 is a counter that counts linearly in a single direction. The protected monotonic counter 604 may count to a sufficiently high number so that the protected monotonic counter 604 does not roll over, such as a 64 bit number ($2^{64}$). For each user, the user login metadata set 602 may increment a per user counter 606 stored in the lockout metadata set 216 with higher assurance authentication mechanisms 218. The lockout driver 214 may increment a global login counter 608 to match the protected monotonic counter 604. The global login counter 608 may be stored in the lockout metadata set 216 with higher assurance authentication mechanisms 218. The lockout metadata set 216 may have a per user hash counter created by executing a hash function on the global login counter 608. The lockout driver 214 may check a boot configuration data (BCD) set 610 for a counter identifier (ID) 612 to identify the protected monotonic counter 604 that is matched with the global login counter 608.

Figure 7:
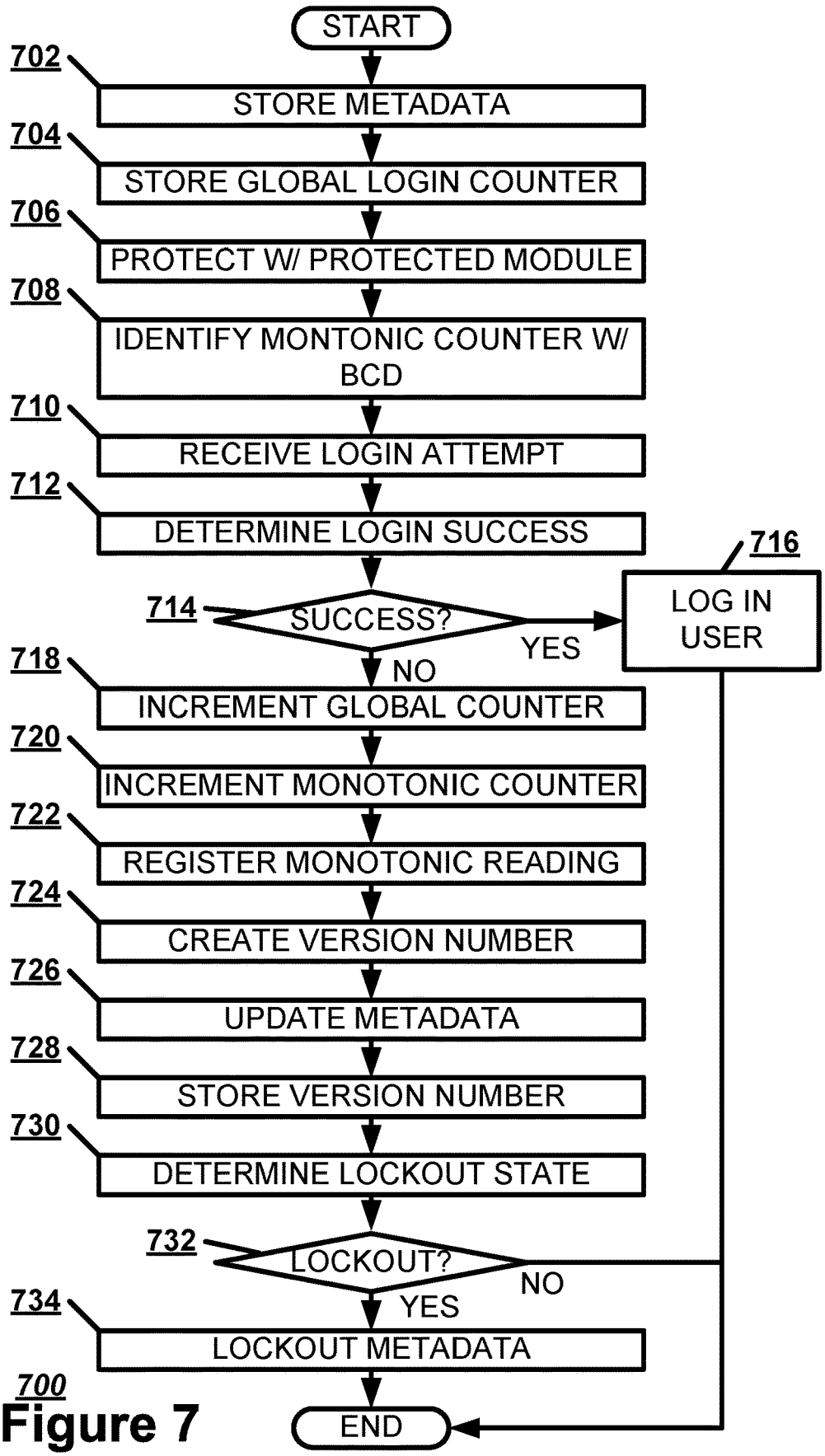
FIG. 7 illustrates, in a flowchart, one embodiment of a method for protecting an integrity protected data set using a matched monotonic counter.

FIG. 7 illustrates, in a flowchart, one embodiment of a method 700 for protecting an integrity protected data set 602 using a matched monotonic counter. The encryption system may store an integrity protected data set 602, such as a user login metadata set 212, for an operating system in a storage location (Block 702). The encryption system may store a global login counter 608 in the lockout metadata set 216 with higher assurance authentication mechanisms 218. (Block 704). The encryption system may protect the integrity protected data set 602, such as the user login metadata set 212, using a protected module 170, such as a trusted platform module (Block 706). The encryption system may identify a protected monotonic counter 604 for the operating system using a boot configuration data set 610 (Block 708).

The encryption system may receive a login attempt from the user (Block 710). The encryption system may determine if the login attempt was successful (Block 712). If the integrity check is successful (Block 714), the encryption system may log in the user to grant the user access to the operating system (Block 716). Otherwise, the encryption system may increment the global login counter 608 stored with the user login metadata set 212 (Block 718). The encryption system may increment the protected monotonic counter 604 upon an unsuccessful login attempt (Block 720). Alternatively, the encryption system may increment the global login counter 608 and the protected monotonic counter 604 regardless of the success or failure of the login attempt. The encryption system may register a monotonic counter reading of the protected monotonic counter 604 in the protected module 170 as the counter reading of a remote counter (Block 722). The encryption system may create a version number based on the counter reading from the protected monotonic counter 604, acting as a remote counter 202 (Block 724). The encryption system may update the integrity protected data set 602, such as the user login metadata set 212, when incrementing a protected monotonic counter 604 (Block 726). The updating of the integrity protected data set 602 may occur slightly before or slightly after incrementing a protected monotonic counter 604. The encryption system may store the version number based on the counter reading in the user login metadata set 212 (Block 728).

The encryption system may determine a lockout state of the user login metadata set 212 based on the counter reading using the protected module 170 (Block 730). For example, the encryption system may determine a lockout state of the integrity protected data set 602 based in part on a comparison of the version number to a lockout counter reading of the monotonic counter. If the counter reading indicates that the integrity protected data set 602 is to be locked down (Block 732), the encryption system may lock down the integrity protected data set 602 by enhancing the encryption of the integrity protected data set 602 (Block 734).

Figure 8:
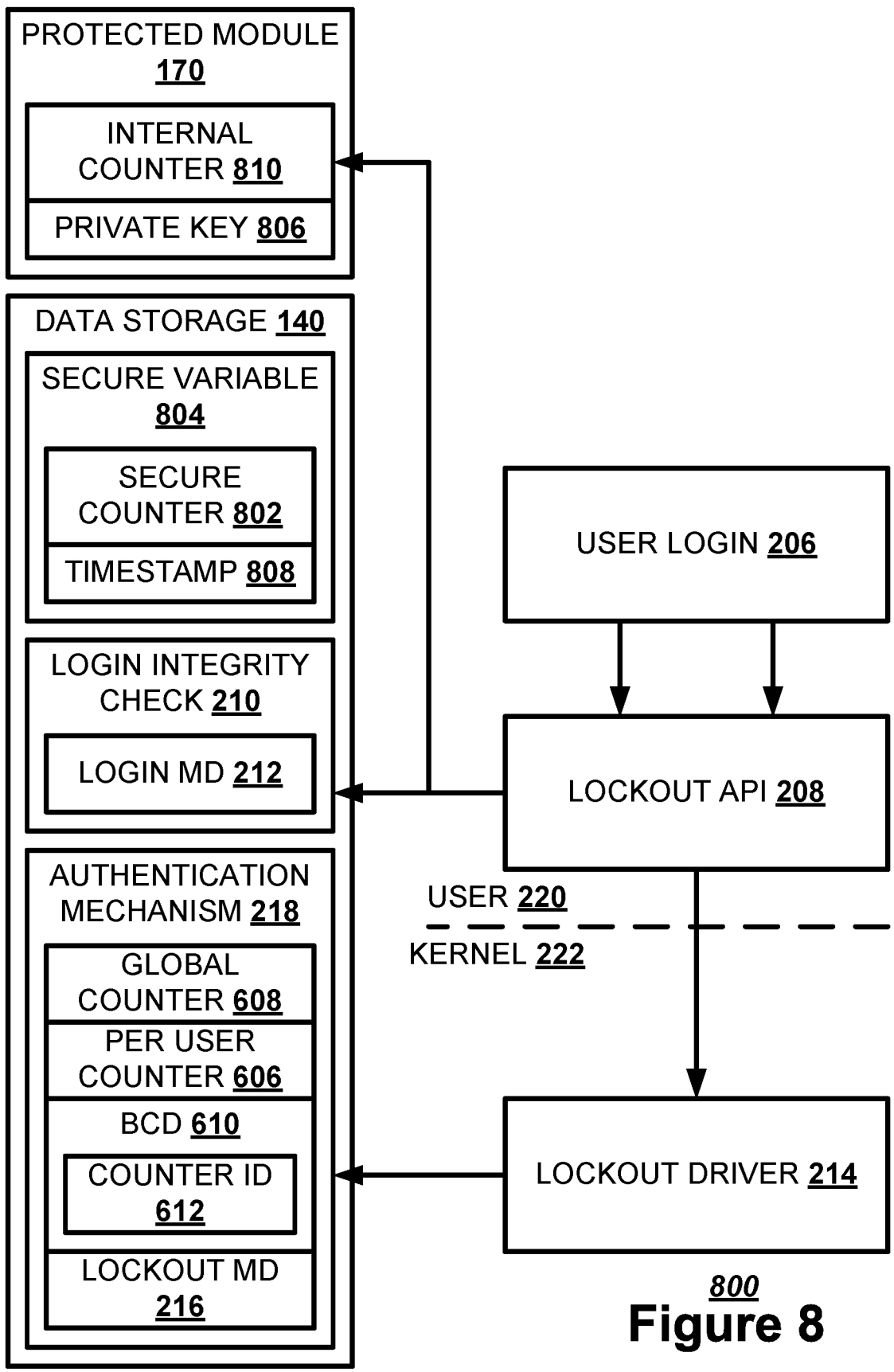
FIG. 8 illustrates, in a block diagram, one embodiment of a secure variable counter configuration.

If the protected module 170 does not have a monotonic counter 604, the protected module 170 may provide a secure counter for synchronization with the local per user counter 606. FIG. 8 illustrates, in a block diagram, one embodiment of a secure variable counter configuration 800. The protected module 170, such as a Unified Extensible Firmware Interface, may store a secure counter 802 in a secure variable 804. The protected module 170 may specify a signing key pair to protect the secure variable 804 from unauthorized access. The protected module 170 may then store the private key 806 as encrypted metadata, either in the protected module 170 or in the data storage 140, so that the secure counter 802 is accessible by the encryption system. The protected module 170 may protect the secure variable 804 from replay by checking a secure timestamp 808 stored with the secure variable 804 signed by the private key 806 against a timestamp associated with a previous counter value of an internal counter 810.

Figure 9:
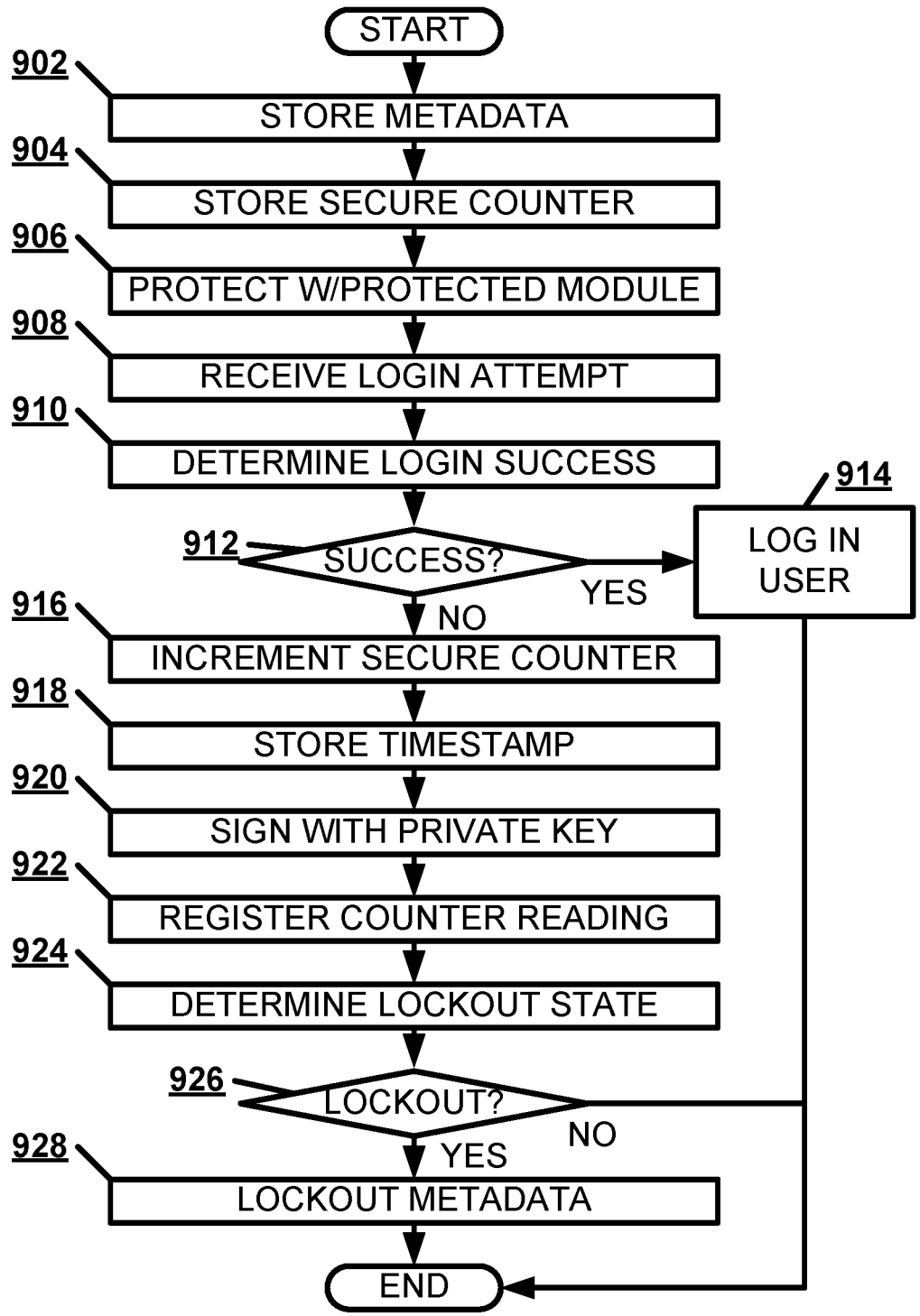
FIG. 9 illustrates, in a flowchart, one embodiment of a method for protecting an integrity protected data set using a secure counter in a secure variable.

FIG. 9 illustrates, in a flowchart, one embodiment of a method 900 for protecting an integrity protected data set 602 using a matched encrypted counter. The encryption system may store a user login metadata set 212 for an operating system in a storage location (Block 902). The encryption system may store a secure counter 802 in a secure variable 804, such as a secure Unified Extensible Firmware Interface variable (Block 904). The encryption system may protect the user login metadata set using a protected module 170, such as a Unified Extensible Firmware Interface (Block 906).

The encryption system may receive a login attempt from the user (Block 908). The encryption system may determine if the login attempt was successful (Block 910). If the login attempt is successful (Block 912), the encryption system may log in the user to grant the user access to the operating system (Block 914). Otherwise, the encryption system may increment the secure counter 802 upon an unsuccessful login attempt (Block 916). Alternatively, the encryption system may increment the secure login counter 802 regardless of the success or failure of the login attempt. The encryption system may store a secure timestamp 808 with the secure variable 804 having the secure counter 802 (Block 918). The encryption system may sign the secure timestamp 808 with a private key 806 of the protected module 170 (Block 920).

The encryption system may register a secure counter reading from the secure counter 802 stored in the secure variable 804 of the protected module 170 as the counter reading of a remote counter (Block 922). The encryption system may determine a lockout state of the user login metadata set 212 based on the secure counter reading (Block 924). If the counter reading indicates that the integrity protected data set 602 is to be locked down (Block 926), the encryption system may lock down the integrity protected data set 602 by enhancing the encryption of the integrity protected data set 602 (Block 928).

Although the subject matter has been described in language specific to structural features and/or methodological acts, the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
storing, in a storage location in a data storage of a computing device, a user login metadata set containing state data used to enforce a login policy for the computing device;
registering a counter reading from a remote counter of login attempts, the remote counter stored in a secure location separate from the storage location, wherein the secure location is a present encrypted location within the data storage of the computing device;
determining a lockout state of the user login metadata set based on the counter reading; and
moving the remote counter to a subsequent encrypted location within the data storage from the present encrypted location in response to a login attempt.

2. The method of claim 1, further comprising:
registering a login attempt as triggering a counter movement.

3. The method of claim 1, further comprising:
registering a monotonic counter reading of a protected monotonic counter as the counter reading of the remote counter.

4. The method of claim 1, further comprising:
incrementing a protected monotonic counter upon a login attempt.

5. The method of claim 1, further comprising:
incrementing a protected monotonic counter upon an unsuccessful login attempt.

6. The method of claim 1, further comprising:
updating the user login metadata set when incrementing a protected monotonic counter.

7. The method of claim 1, further comprising:
identifying a protected monotonic counter for an operating system using a boot configuration data set.

8. The method of claim 1, further comprising:
creating a version number based on the counter reading from the remote counter.

9. The method of claim 1, further comprising:
storing a version number based on the counter reading in the user login metadata set.

10. A tangible non-transitory machine-readable medium having a set of instructions detailing a method stored thereon that when executed by one or more processors cause the one or more processors to perform the method, the method comprising:
storing, in a storage location in a data storage of a computing device, a user login metadata set containing state data used to enforce a login policy for the computing device;
protecting the user login metadata set using a protected module;
registering a counter reading from a remote counter of login attempts, the remote counter stored in a secure location separate from the storage location, wherein the secure location is a present encrypted location within the data storage of the computing device;
determining a lockout state of the user login metadata set based on the counter reading; and
moving the remote counter to a subsequent encrypted location within the data storage from the present encrypted location in response to a login attempt.

11. The tangible non-transitory machine-readable medium of claim 10, wherein the method further comprises:
storing a secure timestamp with the remote counter.

12. The tangible non-transitory machine-readable medium of claim 11, wherein the method further comprises:
signing the secure timestamp with a private key of the protected module.

13. The tangible non-transitory machine-readable medium of claim 10, wherein the counter reading from the remote counter of login attempts is based on a monotonic counter reading of a protected monotonic counter of the protected module.

14. The tangible non-transitory machine-readable medium of claim 13, wherein the method further comprises:
storing a version number created from the protected monotonic counter reading in the user login metadata set.

15. The tangible non-transitory machine-readable medium of claim 13, wherein the method further comprises:
incrementing the protected monotonic counter upon a login attempt.

16. An encryption system for a computing device, comprising:
a protected hardware module that executes a monotonic counter;
a data storage that stores a user login metadata set containing state data used to enforce a login policy for the computing device, the user login metadata set including a version number created from a monotonic counter reading from the monotonic counter; and
a processor configured to:
register a counter reading from a remote counter of login attempts, the remote counter stored in a secure location separate from the storage location, wherein the secure location is a present encrypted location within the data storage of the computing device;
determine a lockout state of the user login metadata set based on the counter reading; and
move the remote counter to a subsequent encrypted location within the data storage from the present encrypted location in response to a login attempt.

\* \* \* \* \*